Dec. 7, 1965     T. T. LUNDE     3,221,700
HATCH COVERS
Filed Dec. 27, 1961     2 Sheets-Sheet 1
FIG_1
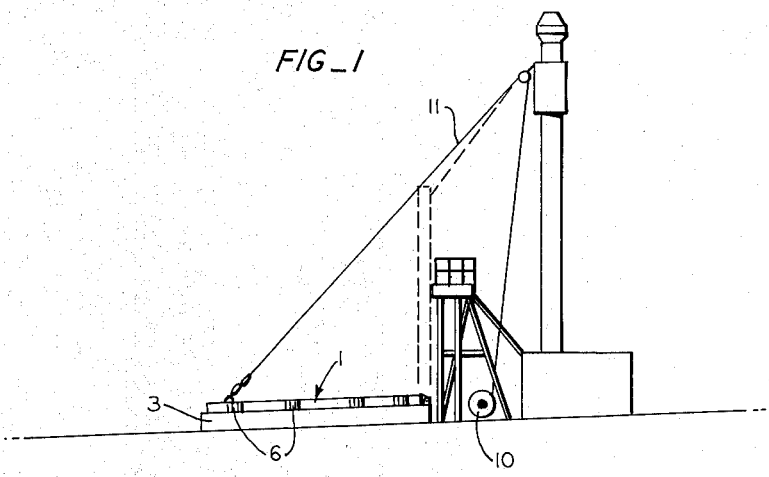
FIG_2
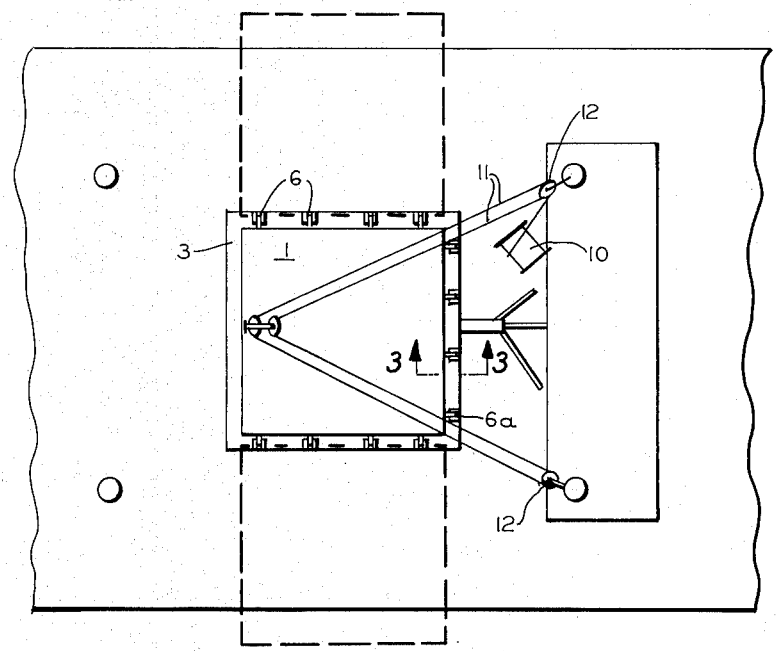
INVENTOR.
THOMAS T. LUNDE
BY
*Hoppe and Mitchell*
ATTORNEYS

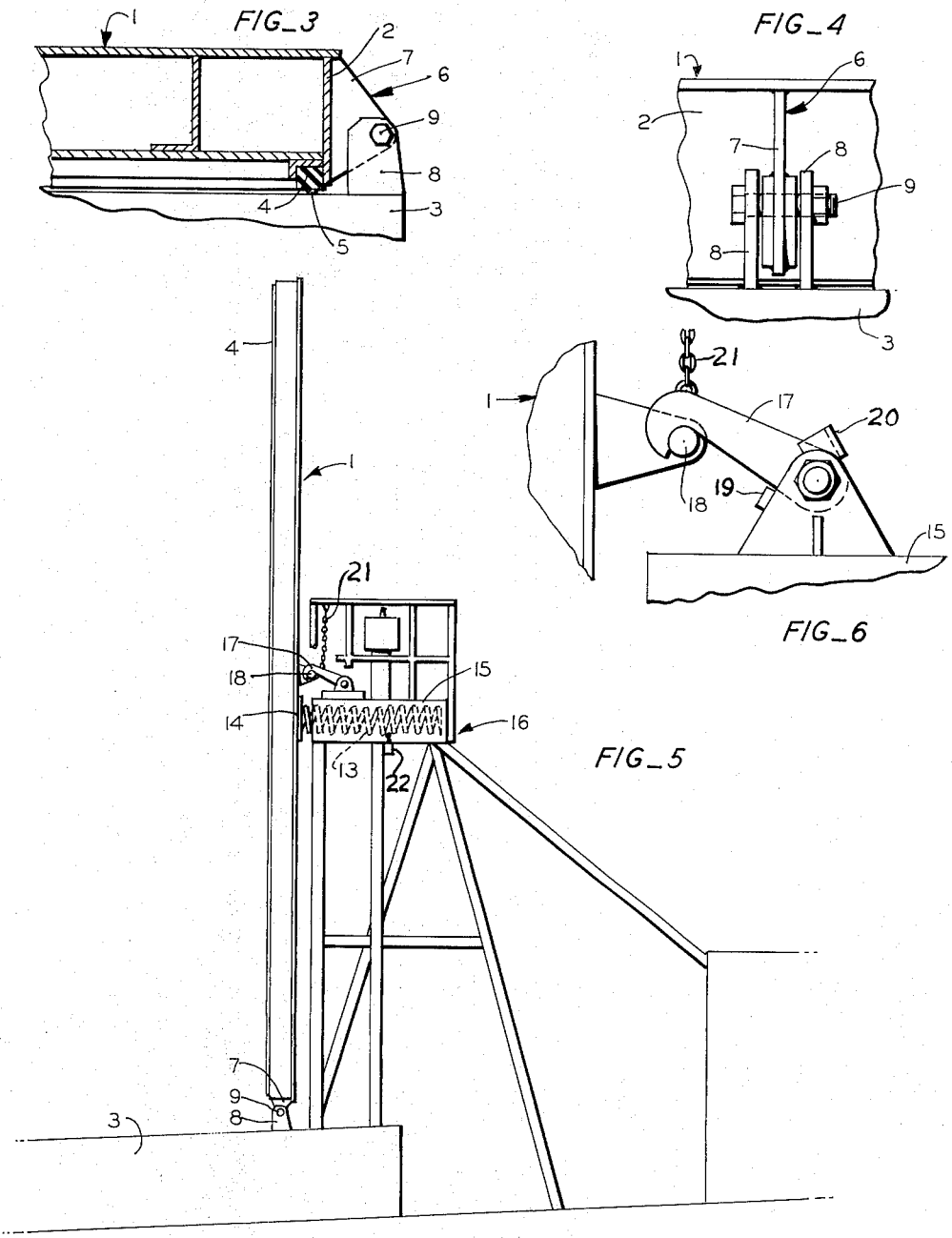

United States Patent Office 3,221,700
Patented Dec. 7, 1965

3,221,700
HATCH COVERS
Thomas T. Lunde, 233 Cervantes Blvd.,
San Francisco, Calif.
Filed Dec. 27, 1961, Ser. No. 162,386
3 Claims. (Cl. 114—201)

This invention generally relates to hatch covers and more particularly relates to hinged hatch covers for main deck hatches of marine vessels and the like.

One object of the present invention is to provide a single piece hatch cover which eliminates the need for rollers, trackways, and a large number of water-tight joints heretofore employed in main deck hatches.

Another object of the present invention is to provide an improved unitary hatch cover of the pontoon type which is easily and rapidly opened and conveniently stowed to permit lading transfer through the hatch opening.

A further object of the present invention is to provide a hinged hatch cover and cooperative pivoting means and safety means for cushioning and arresting the opening motion of the cover and for securing it in the open position.

Other objects and advantages of the invention will be apparent to those skilled in this art upon consideration of the following description of a specific embodiment and the accompanying drawings, wherein:

FIG. 1 is an elevational view of an improved hatch cover embodying the present invention;

FIG. 2 is a plan view of the hatch cover of FIG. 1;

FIG. 3 is a partial sectional view taken along line 3—3 of FIG. 2;

FIG. 4 is an end view of the hinge of FIG. 3;

FIG. 5 is an enlarged side elevational view of one form of spring cushioning means for cooperative use with the hinged hatch cover; and FIG. 6 is an enlarged elevation of the safety latch.

The present invention comprises a single piece hinged hatch cover generally square or rectangular in shape. The cover is selectively hinged from the hatch coaming on any one or more of its sides. Normal cargo handling gear or other means is employed to pivot the cover open and closed about any selected set of hinges. Cooperative cushioning and safety means firmly secure the open covers and reduce operational shock and noise. The covers may be pivoted open and secured in a position perpendicular to the vessel deck or may be opened approximately 180° to lie flat upon the deck, depending upon the availability of adjacent deck space, clearance from ship superstructure, desired mode of cargo handling, and the like.

The hatch cover system illustrates in FIGS. 1, 2 comprises a unitary cover structure 1 generally fabricated so that the cover weight and that of any lading atop of it when closed, is carried by the cover side plates 2 and distributed uniformly around the entire hatch coaming 3. A water-tight joint around the cover periphery is formed by a rubber gasket 4 compressed against a sealing ridge 5 on the hatch coaming 3. A plurality of spaced dogs may be used to seal the hatch, or hinges on the several sides of the cover may be designed to seal the gasketed joint. Effective hatch sealing is obtained by designing the hatch coaming and sealing ridge with extreme rigidity. The cover itself is relatively flexible except for the gasketed edge. This combination of a rigid sealing ridge and flexible cover permits slight deflection of the cover as it is dogged closed and develops a very effective water-tight seal.

The hatch cover 1 pivots about any one of its sides upon a plurality of spaced hinges 6. The cover 1 may be designed to pivot about more than one side by providing similar hinges along each side. Each hinge includes a blade 7 extending outwardly from the hatch cover. The blade is selectively pivotable in a bracket 8 extending upwardly from the hatch coaming 3. The hinge axis comprises, for example, a removable nut and bolt assembly 9 which may be selectively removed from the hinge to permit pivoting of the hatch cover about any one of its sides which is provided with hinges. By removing the hinge axis from all but one side the hatch cover of FIG. 1 can be pivoted about any one of its four sides, for example, to port or starboard as illustrated in FIG. 2.

The illustrated operating rigging is useful for operating a hatch cover pivotable about an athwartships axis. The gear picks up the side of the hatch cover opposite the hinges 6a. The illustrated rigging includes a cargo winch 10 having the operating cable 11 rove through the topping lift swivel blocks 12 and to the hatch cover in a four-part purchase. Other rigging arrangements will be apparent to pivot the covers about either side aligned longitudinally with respect to the vessel axis. These as well as other means for pivoting the hatch covers will be apparent to those skilled in the art and will be a function of the equipment available and the desired direction of hatch cover pivot.

Each hatch cover and its operative rigging cooperates with safety cushioning means functioning to securely retain the cover in its open position, shown in hidden lines in FIG. 1, and to minimize operational shock and noise. The means illustrated is useful for a hatch cover pivotable about either its fore or aft edge and stowed perpendicular to the vessel deck during transfer of lading through the hatch. Similar cushioning means without the safety latch features are provided for hatch covers pivoted 180° and set down upon the adjacent vessel deck as in FIG. 2. The cover then provides a horizontal working platform somewhat similar to conventional multiple pontoon hatch covers presently in use. For example, spring type cushioning means mounted on the deck for vertical compression and elongation receive the hatch covers in a fashion somewhat similar to that of the spring cushioning means illustrated in FIG. 5.

The cushioning means of FIG. 5 includes a compression spring 13 having a bearing plate 14 at one end and arranged for horizontal compression and elongation with a guide means 15. The spring 13 bears at the other end upon a rigid supporting structure mounted on the vessel deck, referred to generally as 16. The hatch cover when opened bears against spring 13 compressing it into the position illustrated in hidden lines in FIG. 5. In this stowed position the hatch cover 1 is in a vertical position. The free length of spring 13 is such that spring compression begins several degrees prior to the pivoting of the cover to the stowed position and sufficient free length is provided to resiliently latch the cover as hereinafter described.

The cover is locked in the stowed position by a pivoted gravity latch 17 which engages a latch pin 18 mounted on the hatch cover along the ship's center line. A pair of latch stops limit the travel of gravity latch 17. As appears in FIG. 6, lower stop 19 holds the latch in relation to the arc of travel of pin 18 so that the pin hits the latch nose, pushes it upwardly limited by stop 20 and gravity causes it to pivot into latching engagement with the pin. The latch embraces the pin around sufficient periphery below a horizontal diameter so that it cannot be disengaged without moving the latch pin under power toward the latch pivot to disengage it. The cover is securely latched against wind loads, ship roll or displacement of the cover center of gravity eccentrically with respect to the hinge axis by spring 13 which forces the pin 18 and latch into secure engagement. This safety feature is extremely important because of the tremendous weight of the hatch cover. The latch 17 is released by pivoting the cover to the right in FIG. 5 under power and by simultaneously disengaging latch 17 from pin 18 with chain 21.

The compression spring also performs the essential function of storing sufficient energy to pivot the hatch cover away from its stowed position once it is unlatched. Hence, sufficient energy is stored in the spring 13 to overcome such adverse conditions as opposing wind loads or, in the event that the vessel trim causes the center of gravity of the hatch cover to fall beyond the dead-center point with respect to the axis about which the cover pivots, the spring pivots the cover until gravity acting upon the cover completes the closing motion. The fall of the hatch cover during the closing motion is braked by the pivoting means such as winch 10.

Another safety feature of the present invention is limit switch 22 mounted on frame 16 for cooperation with the center rod of spring 13. The switch trips slightly beyond the stowed position of the cover and stops the cover pivoting means such as winch 10.

The foregoing description of a specific embodiment of the invention has been given for clearness of understanding only and no unnecessary limitations should be uderstood therefrom. The invention is described in the following claims.

I claim:

1. An improved hatch cover system for a hatch in the deck of a ship comprising a unitary cover structure pivotable about any one of its sides, rigging means for pivoting said cover about any selected one of said sides, pin means carried by said cover, a pivoted gravity latch means, cushioning means for engaging said cover in its open position, and rigid structure mounted on the deck for supporting the latch means and the cushioning means such that the pin means will engage with said latch means and will be biased into firm engagement with said latch means and be retained thereby by said cushioning means.

2. An improved hatch cover system according to claim 1 wherein said cushioning means includes a rigid frame; a compression spring bearing at one end upon said frame and receiving said cover at its other end, and guide means confining the travel of said spring, said gravity latch having a downwardly opening detent for embracing said pin around its periphery substantially beyond a horizontal diameter of said pin on the side remote from the pivot of said latch.

3. An improved hatch cover for use on a hatch in the deck of a ship with said hatch having a rigid coaming which comprises a unitary polygonal cover structure, said structure being flexible relative to said coaming and having a stiff gasketed periphery engageable with said coaming, a plurality of hinge means on said coaming along each of said sides of said cover for permitting selective pivoting of the cover about any of said sides, rigging means for pivoting said cover about a selected side, pin means carried by said cover, a pivoted gravity latch means, cushioning means for engaging said cover in its open position, and rigid structure mounted on the deck for supporting the latch means and the cushioning means such that the pin means will engage with the latch means and will be biased into firm engagement with said latch means and be retained thereby by said cushioning means.

References Cited by the Examiner

UNITED STATES PATENTS

| | | | |
|---|---|---|---|
| 691,752 | 1/1902 | Dawley | 114—201 X |
| 1,573,579 | 2/1926 | Ross | 16—176 X |
| 2,379,623 | 7/1945 | Campbell | 114—203 |
| 3,007,431 | 11/1961 | Dahlin | 114—202 |

FOREIGN PATENTS 787,770  12/1957  Great Britain.

MILTON BUCHLER, *Primary Examiner.*

ANDREW H. FARRELL, *Examiner.*